United States Patent
Balia (10) Patent No.: US 8,095,124 B2
(45) Date of Patent: Jan. 10, 2012

(54) SYSTEMS AND METHODS FOR MANAGING AND MONITORING MOBILE DATA, CONTENT, ACCESS, AND USAGE

(75) Inventor: Hinal K. Balia, Germantown, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 353 days.

(21) Appl. No.: 11/551,404

(22) Filed: Oct. 20, 2006

(65) Prior Publication Data

US 2008/0098062 A1  Apr. 24, 2008

(51) Int. Cl.
*H04M 3/00* (2006.01)
(52) U.S. Cl. ......... 455/418; 455/445; 709/223; 709/226
(58) Field of Classification Search .................. 370/338, 370/331; 455/445, 418; 707/1; 709/223, 709/227
See application file for complete search history.

(56) References Cited

U.S. PATENT DOCUMENTS

| | | | |
|---|---|---|---|
| 6,615,186 B1 * | 9/2003 | Kolls ............................. | 705/26 |
| 6,731,621 B1 * | 5/2004 | Mizutani et al. ............. | 370/338 |
| 7,020,704 B1 * | 3/2006 | Lipscomb et al. ............ | 709/226 |
| 7,120,928 B2 * | 10/2006 | Sheth et al. ..................... | 726/4 |
| 7,209,957 B2 * | 4/2007 | Patron et al. .................. | 709/208 |
| 7,269,853 B1 * | 9/2007 | Dunn ............................. | 726/27 |
| 7,660,902 B2 * | 2/2010 | Graham et al. ................ | 709/229 |
| 2003/0014357 A1 * | 1/2003 | Chrisekos et al. ............. | 705/39 |
| 2003/0070168 A1 * | 4/2003 | Stone ............................. | 725/37 |
| 2003/0186722 A1 * | 10/2003 | Weiner ......................... | 455/558 |
| 2004/0030765 A1 * | 2/2004 | Zilbershtein et al. ......... | 709/223 |
| 2004/0107269 A1 * | 6/2004 | Rangan et al. ................ | 709/219 |
| 2004/0193513 A1 * | 9/2004 | Pruss et al. .................... | 705/30 |
| 2004/0215526 A1 * | 10/2004 | Luo et al. ...................... | 705/26 |
| 2005/0188066 A1 * | 8/2005 | Papanikolaou et al. ....... | 709/223 |
| 2005/0193093 A1 * | 9/2005 | Mathew et al. ............... | 709/219 |
| 2005/0235319 A1 * | 10/2005 | Carpenter et al. ............ | 725/52 |
| 2005/0281237 A1 * | 12/2005 | Heinonen et al. ............ | 370/338 |
| 2005/0286466 A1 * | 12/2005 | Tagg et al. .................... | 370/329 |
| 2006/0046750 A1 * | 3/2006 | Deschenes ..................... | 455/462 |
| 2006/0050686 A1 * | 3/2006 | Velez-Rivera et al. ........ | 370/352 |
| 2006/0075467 A1 * | 4/2006 | Sanda et al. .................... | 726/1 |
| 2006/0184609 A1 * | 8/2006 | Deng ............................. | 709/203 |
| 2006/0293057 A1 * | 12/2006 | Mazerski et al. ............. | 455/445 |

* cited by examiner

*Primary Examiner* — Nick Corsaro
*Assistant Examiner* — Mahendra Patel

(57) ABSTRACT

A system, method, and process for managing and monitoring mobile data, content, access, and usage of mobile devices are provided. The described exemplary system, method, and process provide an infrastructure for managing and monitoring various applications and services of mobile devices such as Internet access, voice, messaging, gaming, music, and video.

18 Claims, 4 Drawing Sheets

SYSTEMS AND METHODS FOR MANAGING AND MONITORING MOBILE DATA, CONTENT, ACCESS, AND USAGE

BACKGROUND

As the Internet increased in popularity, parents became worried about the content of the websites that their children were accessing. Today, the increasing use of mobile devices (e.g., cell phones, PDAs, pagers, and similar devices) have only further enhanced this and similar apprehensions of parents. Because many mobile devices can provide easy access to an array of applications from almost any location at any time, it has become increasingly difficult for parents to manage and monitor the mobile data, content, access, and usage of their children on their mobile devices. For example, many mobile devices allow users to access numerous applications such as voice (e.g., phone and voicemail), messaging (e.g., SMS/MMS), Internet, gaming, music, and video. Typically, the access to these applications can be easily obtained with the touch of a button. Moreover, each member of a household might have more than one mobile device, which would even further complicate the situation of managing and controlling children's use of their mobile devices.

In the past few years, many efforts have been made to address customers' needs in using mobile devices, but none provides a full solution for the above-stated problem. For example, some service providers offer customers "pay-as-you-go" plans to control use of their mobile devices, where if a customer's prepaid balance falls below a certain threshold, the service provider directs the subscriber to purchase additional time. However, such "pay-as-you-go" plans have limited applicability in the context of prepaid services. Another example is for service providers to provide customers or subscribers with mobile devices, e.g., cell phones, that were made with configurable restrictions, pursuant to which the customers or subscribers can program and personalize the devices. For instance, a parent is able to login to a child's phone to apply usage and phone number restrictions on that particular phone. This solution, again, is restrictive because it requires manual configuration of each of the pre-selected types of mobile devices. In addition, like many other efforts, this solution fails to address customers' concerns on the content accessible from the mobile devices.

In light of the above, there exists a need to provide customers, such as parents, with an improved comprehensive method and system for managing and monitoring the mobile data, content, access, and usage of their own or their affiliates' mobile devices.

BRIEF DESCRIPTION OF THE DRAWINGS

Reference will be made to the accompanying drawings, which are not necessarily drawn to scale, and wherein.

DETAILED DESCRIPTION

Exemplary embodiments will now be described hereinafter with reference to the accompanying drawings, in which exemplary embodiments and examples are shown. Like numbers refer to like elements throughout.

Figure 1:
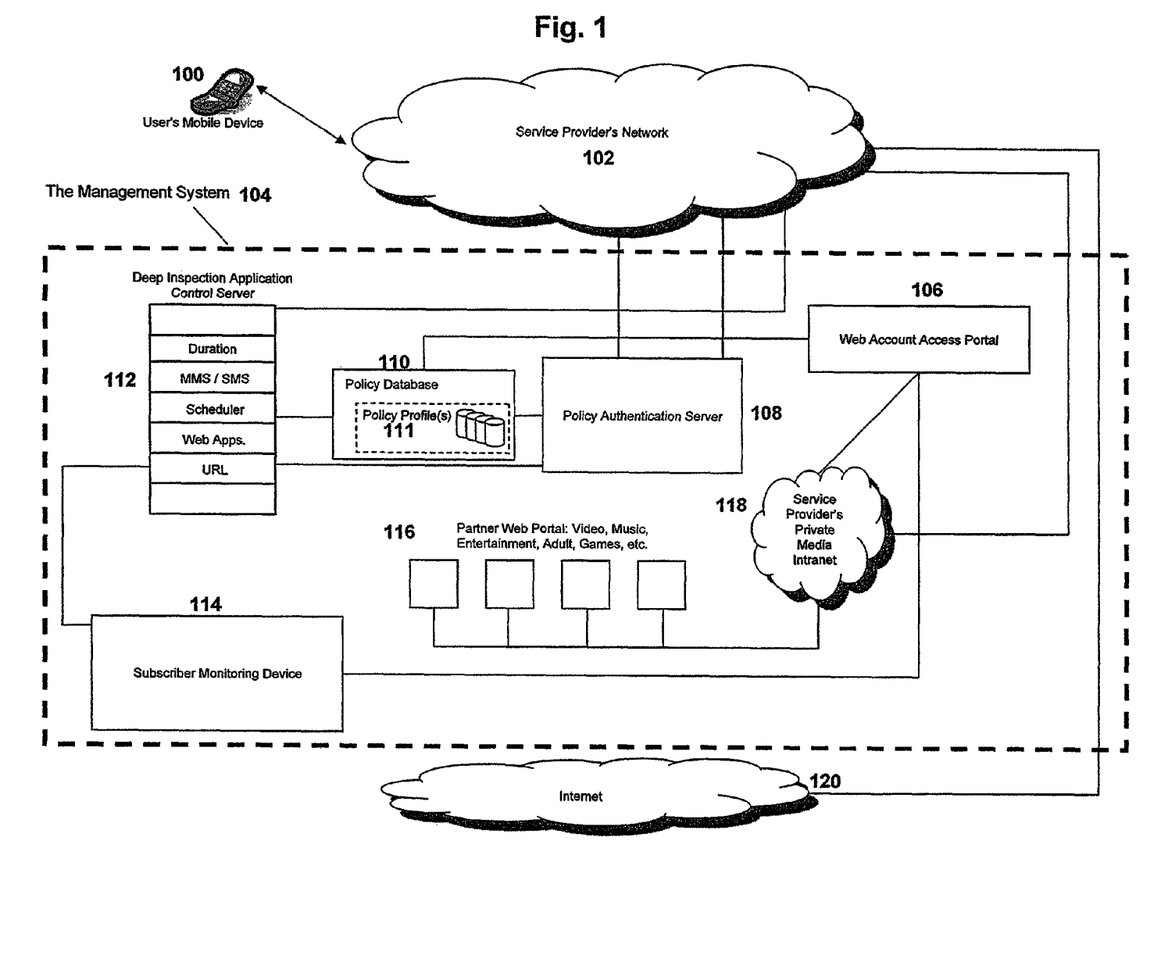
FIG. 1 illustrates a system for managing and monitoring mobile data, content, access, and usage of mobile devices according to an embodiment.
Figure 2:
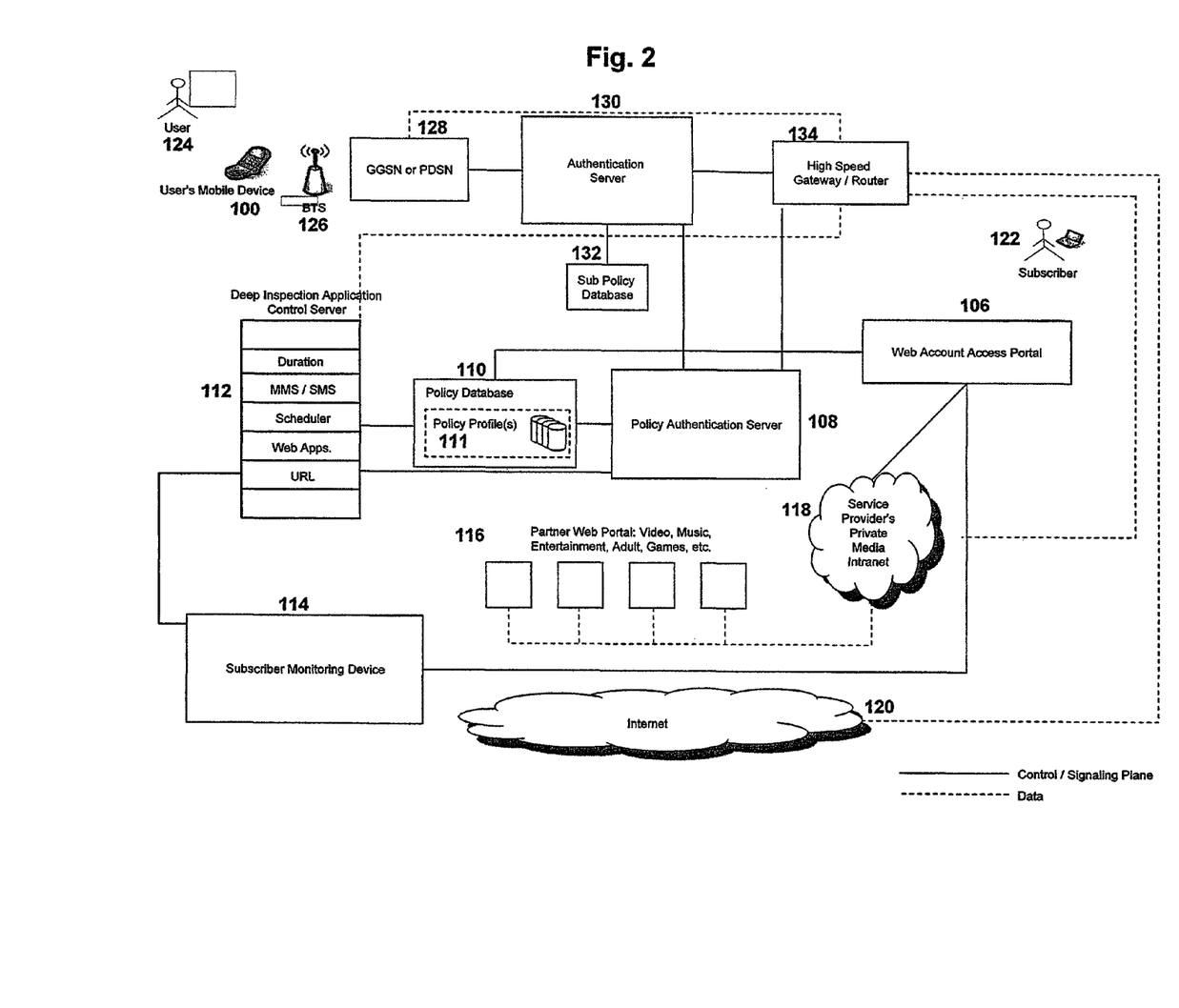
FIG. 2 illustrates in further detail the components of the system in FIG. 1, including a service provider's network and a customer's access to the network according to an embodiment.

FIGS. 1 and 2 provide a high-level overview of an improved system for managing and monitoring mobile data, content, access, and usage of mobile devices according to one embodiment. As shown in FIGS. 1 and 2, the management system 104 provides a network-based solution for managing and monitoring mobile data, content, access, and usage of mobile devices. Specifically, the management system 104 can be used to manage mobile data, content, access and usage of a user's mobile device 100 through a service provider's network 102, or the general Internet 120 or other wide area network where a service provider's online service applications can be accessed. Each of these components will be described in detail below with reference to FIGS. 1 and 2.

As shown in FIG. 2, in operation, the management system 104 may involve a subscriber 122 and a user 124. The subscriber 122 can be an entity (e.g., corporation) or an individual subscribing to mobile or wireless services from a mobile or wireless service provider (service provider), while a user 124 typically refers to an individual that operates a mobile device associated with a particular subscriber's 122 account. The mobile device operated by a user 124, illustrated as the user's mobile device 100 in FIGS. 1 and 2, can be a cellular phone, PDA, handheld, or any other portable computing device. Usually there is no limit to the number of subscribers 122 or users 124 associated with a specific account. For example, the subscriber 122 can be a parent and the users 124 may include all the children on the same subscribing account. In another instance, the subscriber 122 can be a corporation paying for the mobile or wireless services of its employees, and thus, all those beneficiary employees become the users 124. On certain occasions, the subscriber 122 and user 124 can be the same entity, i.e., when the mobile service subscribing account has only one person associated therewith. Also, a user 124 may have more than one mobile device associated with an account subscribed to by the subscriber 122. For instance, a parent may have both a cellular phone and a personal digital assistant (PDA) associated with the same account.

The service provider's network 102 illustrated in FIGS. 1 and 2 can be any type of telecommunications networks. The service provider's network 102 may employ various protocols and technologies such as advanced mobile phone systems (AMPS), time division multiple access (TDMA), code division multiple access (CDMA), and global system for mobile communications (GSM). Many of these radio-based networks operate with base stations that initially handle the incoming traffic. The base station function is often divided into two main functional elements: the Base Station Controller (BSC) and the Base Transceiver System (BTS) 126, as shown in FIG. 2. The BTS 126 consolidates several transceivers at a single location. The BTS 126 may communicate with and pass traffic to the Gateway GPRS Support Nodes (GGSN) 128 or Packet Data Serving Nodes (PDSN) 128. The GGSN 128 and PDSN 128 serve as gateways between mobile networks and packet data networks. Once the traffic reaches the service provider's network 102, the service provider's network 102 can pass the traffic to the management system 104.

In one embodiment, the management system 104 provides the subscriber 122 with significant control over a user's mobile device 100, such as limiting the time duration of phone calls, time period of allowed calls, number of usable minutes in a particular time period, content of web-based applications, content and usage of multimedia applications, access to specific categories of videos and games, access to services that require a fee, access to specific websites, and numerous other applications. In another embodiment, the management system 104 is configured to provide a user-friendly programmable interface such that any service provider can integrate the system 104 into its existing systems and network 102 to allow its subscribers 122 to manage and monitor all traffic that passes to the user's mobile device 100. Alternatively, the management system 104 can be separate from but accessible to a service provider's network 102. The management system 104 according to an exemplary embodiment is not dependent upon the protocols or technologies employed in a particular service provider's network 102. In addition, the applicability of management system 104 is not limited to the wireless or mobile context; instead, it can be seamlessly integrated into any wired network to perform similar management functionalities with respect to wireline devices.

FIGS. 1 and 2 also provide an architectural view of the management system 104 of one embodiment. Typically, the management system 104 resides on a web server in a computer network, which can be a packet switched network, such as a wide area network (WAN), a local area network (LAN), metropolitan area network (MAN), the Internet, or any other similar types of communication networks. Various protocols can be utilized by these computer networks, including Internet Protocol (IP), Frame Relay (FR), Point-to-Point Protocol (PPP), or any other data protocol. Moreover, the computer network typically contains switching or routing equipment designed to transfer the traffic to different segments or components of the network. The network traffic may be of any type including text, graphics, video, e-mail, multimedia, documents, voice, audio, and any other forms of data. In operation, the traffic would be passed to the management system 104 by the service provider's network 102. The architecture of FIGS. 1 and 2 is only exemplary and various embodiments can be used with any type of communications system, computer network, protocol, or combination thereof.

Figure 3:
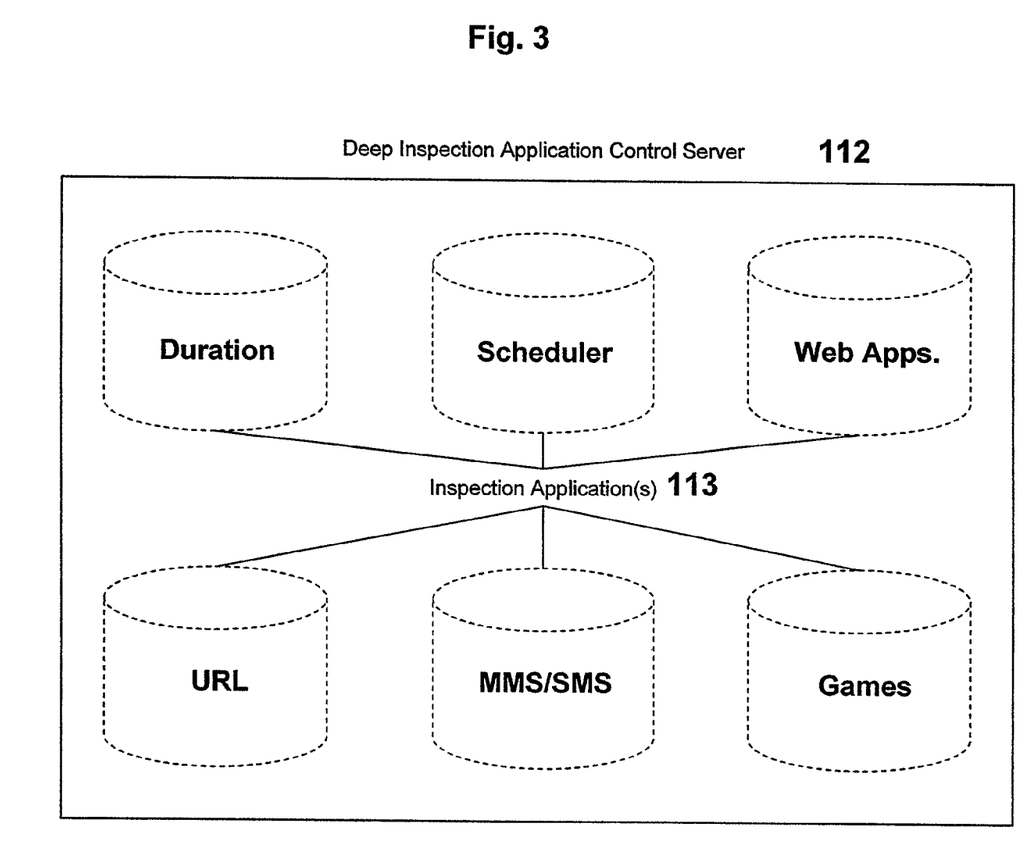
FIG. 3 shows a particular component in the system in FIG. 1, a Deep Inspection Application Control Server and primary application modules comprised thereof, according to an embodiment.

Referring to FIGS. 1, 2, and 3, a detailed description of each component of the management system 104 according to various embodiments is provided. At a high level, in one embodiment, the management system 104 comprises a Web Account Access Portal 106, Policy Authentication Server 108, Policy Database 110, Deep Inspection Application Control Server 112, Subscriber Monitoring Device 114, and Partner Web Portal 116.

As shown in FIGS. 1 and 2, the Web Account Access Portal 106 provides a subscriber 122 with an interface through which the subscriber 122 can manage and monitor the mobile devices associated with the subscriber's account. As such, the Web Account Access Portal 106 is generally embodied by software that is stored by a memory device, such as a server within the management system 104, and that is configured to provide the interface for providing the subscriber with the requested information and for receiving input from the subscriber as described herein upon execution of the software, such as by a server or the like. The subscriber 122 can access the Web Account Access Portal 106 via a network, such as the Internet 120, through a device capable of accessing the network, such as a mainframe station, a desktop PC, a laptop PC, a hand held device (e.g., PDA or data acquisition and storage device), or a processing device embodied within another apparatus. Through the network-accessible device, a subscriber 122 may login to the subscriber's account and, for each mobile device associated with the subscriber's account, establish a Policy Profile 111 in the Policy Database 110. As shown in FIGS. 1 and 2, one subscriber may have more than one policy profile 111 when there are multiple mobile devices associated with the subscriber's account. In operation, the subscriber 122 can associate, create, update, modify, delete, and store a Policy Profile 111 for each mobile device associated with the subscriber's account. Typically, a Policy Profile 111 is defined to include various parameters set forth by the subscriber 122 for a specific mobile device. For example, the subscriber 122 can configure the Policy Profile 111 to contain a time period where incoming calls are prohibited, an access limitation that only allows access to video games with a PG or G rating, or a content limitation that only permits Internet access to educational websites. Through the Web Account Access Portal 106, the subscriber 122 can also monitor various incoming requests from each user's mobile device 100, due to, in large part, the ability of the management system 104 to track and provide statistics as well as almost real-time status regarding the data, content, access, and usage of each mobile device. For instance, a subscriber 122 can login to the Web Account Access Portal 106 and view how many minutes were used during a particular time period, what websites were accessed, what websites were attempted to be accessed but for which access was denied, and what types of games were played. In an exemplary embodiment, the Web Account Access Portal 106 is configured to access the Policy Database 110 and communicate with the Subscriber Monitoring Device 114 through a network, such as the Internet 120. In addition, the Web Account Access Portal 106 may interact with the Partner Web Portal 116 through the service provider's private media intranet 118, as will be described in detail below.

The Policy Authentication Server 108, as illustrated in FIGS. 1 and 2 is configured to access and retrieve data in the Policy Database 110, to determine whether a user's mobile device 100 is associated with any Policy Profile 111. If the Policy Authentication Server 108 identifies a Policy Profile 111 associated with the user's mobile device 110, the Policy Authentication Server 108 will send instructions to the service provider's network 102 before allowing the traffic to be sent to the user's mobile device 100, with the instructions specifying that the traffic directed to the user's mobile device 100 should be mirrored to the management system 104 for inspection prior to delivery to the user's mobile device 100. In inspecting the mirrored traffic, the management system 104 would specifically examine whether the traffic complies with the Policy Profile 111 and then determine whether the traffic is allowed to reach the user's mobile device 100. Alternatively, if the Policy Authentication Server 108 determines that a user's mobile device 100 is not associated with any Policy Profile 111, the Policy Authentication Server 108 will instruct the service provider's network 102 to transmit the traffic to the user's mobile device 100 without mirroring the traffic to the management system 104. In that scenario, the management system 104 does not need to inspect the traffic directed to a user's mobile device 100. The Policy Authentication Server 108 queries the Policy Database 110 to determine if a user's mobile device 100 has a Policy Profile 111 associated with it. These queries by the Policy Authentication Server 108 to the Policy Database 110 are generally executed based on information about a user's mobile device 100 contained in layer 2 or layer 3 of the packets (corresponding to the Open Systems Interconnection (OSI) Model) or, in the case of a phone, it can be based on the Mobile Subscriber ISDN (MSISDN) number, although other identifiers of the data packets may be employed.

The Policy Authentication Server 108 typically comprises a processor or other computing device (hereinafter generically referenced as a "processor") that is configured to be able to access to one or more databases stored in a secondary memory or primary memory. Usually the processor is also configured to communicate with external devices using an I/O controller that typically interfaces with a LAN. The memory and/or external devices may be integrated as part of the Policy Authentication Server 108, or alternatively, reside in different, proximate or remote, locations that are accessible to the Server 108. For example, the communication between the Server 108 and the remote devices is typically accomplished by routing data from the LAN over a communications facility to a WAN. One or more of the Policy Authentication Servers 108 may be used in exemplary embodiments.

In FIGS. 1 and 2, only one Policy Database 110 is illustrated, but again, the Policy Database 110 may include several databases, each of which is configured to store various Policy Profiles 111. In one embodiment, through various network connections, the data in the Policy Database 110 is made easily accessible to various components of the management system 104, such as the Web Account Access Portal 106 as described above, the service provider's network 102, the Policy Authentication Server 108, and the Deep Inspection Application Control Server 112.

As will be further illustrated in FIG. 3, the Deep Inspection Application Control Server 112 contains at least one inspection application 113 that is designed and configured to examine data directed to a specific user's mobile device 100 against the associated Policy Profile 111 to determine whether certain content and usage limitations as set forth in the Policy Profile 111 are satisfied. A typical inspection process works as follows: upon the determination that a Policy Profile 111 is associated with a particular user's mobile device 100, the Policy Authentication Server 108 will retrieve a copy of Policy Profile 111 from the Policy Database 110 and transmit the Policy Profile 111 to the Deep Inspection Application Control Server 112. In response to the received data traffic and Policy Profile 111, the Deep Inspection Application Control Server 112 will select and execute a particular inspection application 113 that is designed to inspect the data traffic against the Policy Profile 111. If the traffic does not comply with the Policy Profile 111 associated with the user's mobile device 100, the Deep Inspection Application Control Server 112 will then inform the Authentication Server 130 of the noncompliance. In response, the Authentication Server 130 would start several protective actions, including (1) providing a redirect message to the user's mobile device 100, in the form of a text message to the mobile device that provides the customer service contact number of the service provider's network 102 that the user 100 can contact in order to identify the reason for the failure of a specific service request, (2) prohibiting the user's mobile device 100 from accessing to the requested service or application, and (3) updating the information in the Subscriber Monitoring Device 114, such as the activity history of the user's mobile device 100 to record the access attempts and any denials. In practice, the traffic directed to a particular user's mobile device 100 may be identified by the Deep Inspection Application Control Server 112 and the inspection application 113 based on various identifiers, such as the MAC address (e.g., layer 2 information), the IP address (e.g., layer 3 information), the MSISDN number, or any other traffic identifiers.

The Deep Inspection Application Control Server 112 also typically comprises a processor or other computing device (hereinafter generically referenced as a "processor") that is configured to be able to access to one or more memory device. Usually the processor is also configured to communicate with external devices using an I/O controller that typically interfaces with a LAN. The memory and/or external devices may be integrated as part of the Deep Inspection Application Control Server 112, or alternatively, reside in different, proximate or remote, locations that are accessible to the Server 112. For example, the communication between the Server 112 and the remote devices is typically accomplished by routing data from the LAN over a communications facility to a WAN. One or more of the Deep Inspection Application Control Servers 112 may be used in exemplary embodiments.

In another embodiment, the Deep Inspection Application Control Server 112 is also configured to transmit data (e.g., the content and usage statistics) regarding each user's mobile device 100 for updating the information in the Subscriber Monitoring Device 114. As a result, a subscriber 122 is able to monitor the traffic of each user's mobile device 100 associated with the subscriber's 122 account. Reversely, the Deep Inspection Application Control Server 112 can query the Subscriber Monitoring Device 114 to obtain statistics and information regarding previous activity (e.g., the number of minutes used to date) of a user's mobile device 100.

Depending on the specific inspection functions (i.e., what service parameters to inspect), more than one inspection application 113 may be implemented and stored on the Deep Inspection Application Control Server 112. For example, FIG. 3 shows several exemplary inspection applications 113, including, and not limited to, an application for inspecting the time duration permitted for a single call, an application for inspecting the time period of allowed calls, an application for inspecting the number of usable minutes in a particular time period, an application for inspecting the allowable content rating for web-based applications, an application for inspecting the allowable content rating for multimedia applications, an application for inspecting access to specific URLs, and an application for managing numerous other applications and services. As a person of ordinary skill may appreciate, in operation, the inspection application 113 may be varied, customized and implemented to tailor specific customer needs. In inspecting the traffic directed to a user's mobile device 100 for compliance with its Policy Profile 111, the inspection application 113 typically examines whether certain pre-defined thresholds or requirements in the Policy Profile 111, such as usage or content limitations, are satisfied in the inspected traffic.

The Subscriber Monitoring Device 114, depicted in FIGS. 1 and 2, is typically embodied by a computing device, such as a personal computer, operating under software control to enable a subscriber to track statistics as well as almost real-time information regarding the content, access, and usage of each mobile device associated with a subscriber's account. In operation, the Subscriber Monitoring Device 114 receives statistical or real-time data from the Deep Inspection Application Control Server 112 and saves the received data in one or more databases that are accessible to other web servers and portals, such as the Web Account Access Portal 106 shown in FIGS. 1 and 2. Through the communication between the Web Account Access Portal 106 and the database(s) associated with the Subscriber Monitoring Device 114, a subscriber 122 may submit inquiries and receive answers about statistics as well as almost real-time information regarding the content, access, and usage of each mobile device associated with the subscriber's account. Alternatively, the data in those database(s) associated with the Subscriber Monitoring Device 114 can be uploaded to the Web Account Access Portal 106 for a subscriber 122 to search and view. For instance, a subscriber 122 can view the number of minutes used during a particular time period, the websites accessed, the websites to which access was denied and the games played.

FIGS. 1 and 2 also illustrate a Partner Web Portal 116 that provides an interface through which a service provider may provide its users with easy access to a series of media services, such as video, music, entertainment, and games for a fee or on a complimentary basis. In practice, the Partner Web Portal 116 is generally embodied by software that is stored by a memory device and that is configured to provide the aforementioned interface upon its execution, such as by a media server that is configured to provide services such as video, music, entertainment, and games to a user's mobile device 100. In one embodiment, the media server of the Partner Web Portal 116 is configured to be connected to a service provider's private media intranet 118, and further, to the service provider's network 102. Under this configuration, the media server of the Partner Web Portal 116 is able to communicate with various web servers and portals such as the Web Account Access Portal 106. As a result, a subscriber 122 is able to, by logging onto the Web Account Access Portal 106, pre-define and configure what media services and applications can be allowed for each user's mobile device 100 associated with the subscriber's account. For future inspection purposes, such pre-definition and configuration is to be stored in the Policy Profile 111 associated with the user's mobile device 100.

The management system 104 is capable of managing and monitoring the mobile data, content, access, usage and other information concerning different users' mobile devices associated with a subscriber's account. For further illustration of the system's functionalities, the following exemplary services and applications will be described.

In one embodiment, the management system 104 can manage and monitor the duration of phone calls or other services and applications. For example, a subscriber 122 can configure the Policy Profile 111 associated with a user's mobile device 100 to limit the duration of phone calls, games, or Internet access to two minutes per session during a specified time period, e.g., from 12:30 PM to 6:00 AM. By setting such time limitations, the subscriber 122 may discourage unnecessary lengthy use of phone services, especially during an expected busy time period. This service can be monitored by the management system 104 that performs a process of inspecting layer 2 or layer 3 of data packets. Specifically, time stamps on the data packets would be examined to determine whether a call exceeds the time duration as defined in the Policy Profile 111. If so, the active call will be inactivated or terminated, preferably, with a warning message to the user.

In another embodiment, the management system 104 provides a scheduling function that allows a subscriber 122 to set a time period where access to the Internet, games, music, or incoming phone calls should be denied on a user's mobile device 100. For example, through this scheduler function, parents can set the time limitation, e.g., between 12:30 PM and 6:00 AM, to their children's use of mobile devices. In operation, a subscriber 122 includes the time limitation in the Policy Profile 111. When the data packets are received, the management system 104 would first inspect the time stamps at layer 2 or layer 3 of the data packets or the MSISDN number of each incoming phone call, then verify the time information with the control settings in the Policy Profile 111, and finally decide whether to block or allow the data session. However if a call is being received by or originated from numbers within the subscriber's account, these calls will be permitted.

Moreover, the management system 104 can provide the subscriber 122 with the ability to set usage limits on various applications and services. For example, the subscriber 122 can limit the number of MMS/SMS messages or picture messages to 175 messages for a specific time period. Because the Subscriber Monitoring Device 114 tracks statistics regarding the data, content, access, and usage of each mobile device, the Deep Inspection Application Control Server 112 can send queries to the Subscriber Monitoring Device 114 to obtain the statistics and information regarding previous activity, e.g., the total number of messages sent during the specified period. As a result, the Deep Inspection Application Control Server 112 can enforce the messaging limitation contained in the Policy Profile 111 with accuracy.

The management system 104 can also provide a subscriber 122 with the ability to control users' access to various web-based applications from their mobile devices. With the increasing access to the Internet from mobile devices, such capability has become significantly useful, especially for parents to prevent their children from accessing or downloading specific categories of videos and games. In one exemplary embodiment, the management system 104 can monitor and prevent access to specific websites by, for example, searching for key words within the text, image names, or URL of each webpage. Alternatively, the Partner Web Portal 116 is configured to allow the management system 104 to prevent certain applications and services from reaching a user's mobile device 100. Under this alternative configuration, the service provider can assign each service and application (e.g., games, videos, music, chat rooms, and media based applications) a rating. For example, each service or application could be assigned a rating such as G, PG, Y7, R15, R18, R21, and XXX. Using the rating information, a subscriber 122 can set the allowable rating level for each mobile device and prevent access to any applications or services on the Partner Web Portal 116 that fall below the allowed rating for the user 124. As stated above, all the restrictions to the web related content, access, usage of a user's mobile device will be pre-defined and stored in the Policy Profile 111 associated with the user's mobile device.

The services and functions provided by the management system 104 are not limited to the above-illustrated examples. Instead, many alternative applications and services may be offered according to various exemplary embodiments.

Figure 4:
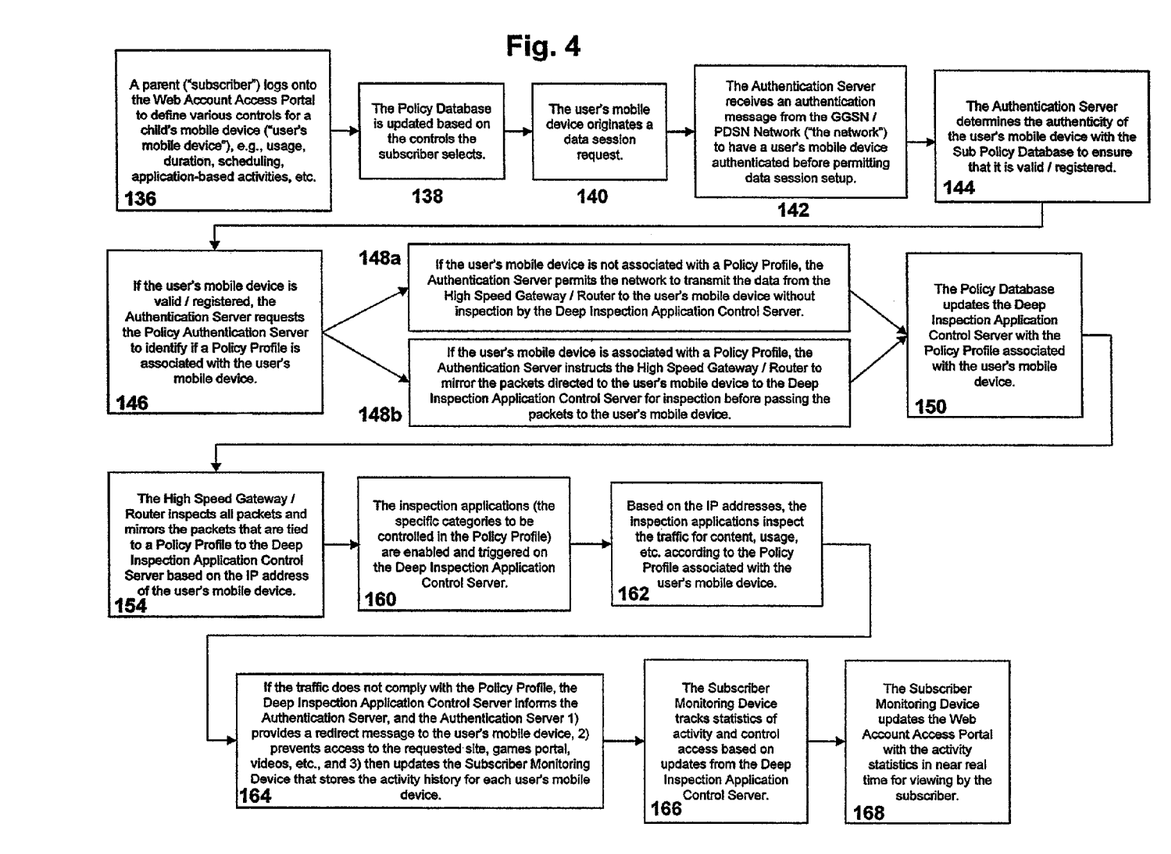
FIG. 4 is a flow chart showing the process algorithm performed by the system in FIG. 1 in managing and monitoring mobile data, content, access, and usage according to an embodiment.

Referring to FIG. 4, an exemplary process performed by the management system 104 in monitoring, controlling and managing data, content, usage of users' mobile devices will be described. For easy illustration, a parent-child scenario is used in the following process, but embodiments are not limited to the illustration, and can apply in various other contexts where mobile phone use needs to be monitored.

Before the process begins, a parent establishes an account with a service provider for wireless or mobile services. The parent further establishes his child as a user 124 on the account. Thus, the parent is now a subscriber 122, and his child is now a user 124. The subscriber 122 is provided with credentials (i.e., user name and password) to obtain access to the Web Account Access Portal 106.

As shown in Step 136, the subscriber 122 logs onto the Web Account Access Portal 106 to define various controls for his child's 124 mobile device ("user's mobile device 100"), e.g., usage, duration, scheduling, application-based activities, and multimedia applications. Such pre-defined controlling information will be saved in a Policy Profile 111 that is associated with the user's mobile device 100 in the Policy Database 110. The Policy Profile 111 can be updated whenever the subscriber 122 changes the control instructions on the use of users' mobile devices associated with the subscriber's account, as shown in Step 138.

When the user 124 needs to use a service or application that requires access to the service provider's network 102 and attempts to initiate a data session, in Step 140, the user's mobile device 100 originates a data session request with the service provider's network 102. In Step 142, the Authentication Server 130 receives an authentication message from the GGSN/PDSN 128 to have the user's mobile device 100 authenticated before permitting the data session setup. Then in Step 144, the Authentication Server 130 determines the authenticity of the user's mobile device 100 by sending queries to the Sub Policy Database 132 to determine whether the user's mobile device 100 is valid or registered. If the user's mobile device 100 is valid or registered, the Authentication Server 130 will send a request to the Policy Authentication Server 108 to identify whether a Policy Profile 111 is associated with the user's mobile device 100 as shown in Step 146.

In Step 148a, if no Policy Profile 111 is associated with the user's mobile device 100, the Authentication Server 130 will instruct the service provider's network 102 to transmit the data from the High Speed Gateway/Router 134 to the user's mobile device 100 without any additional inspection by the Deep Inspection Application Control Server 112. Alternatively, if the user's mobile device 100 is associated with a Policy Profile 111, the Authentication Server 130 will instruct the High Speed Gateway/Router 134 to mirror the traffic directed to the user's mobile device 100 to the Deep Inspection Application Control Server 112 for inspection before passing the data packets to the user's mobile device 100 in Step 148b. In this regard, the management system 104 would permit the service provider's network 102 to transmit data from the High Speed Gateway/Router 134 to the user's mobile device 100 if it complies with the Policy Profile 111.

In preparation for performance of the inspection, the Deep Inspection Application Control Server 112 may be updated in Step 150 in accordance with the Policy Database 110 to reflect any updates in the Policy Profile 111 associated with the user's mobile device 100. In Step 154, the High Speed Gateway/Router 134 inspects all data packets and mirrors the packets tied to a Policy Profile 111 to the Deep Inspection Application Control Server 112 based on the IP address of the user's mobile device 100. If the user's mobile device 100 does not have a Policy Profile 111 associated with it, its traffic passes from the High Speed Gateway/Router 134 without inspection by the management system 104 as noted above.

In response to receiving packets tied to a Policy Profile 111, specific categories of the inspection applications 113 that are available to the Deep Inspection Application Control Server 112 that are to be controlled in the Policy Profile 111 would be triggered and executed by the Deep Inspection Application Control Server 112 in Step 160. In Step 162, based on the IP addresses, the activated inspection applications 113 inspect the traffic for usage and content compliance with the Policy Profile 111 associated with the user's mobile device 100. Depending on the application or service, this inspection can be done from layer 2 to layer 7. If the traffic does not comply with the Policy Profile 111, the Deep Inspection Application Control Server 112 signals the Authentication Server 130, and in response, the Authentication Server 130 will, as shown in Step 164, perform an authentication process, including the steps of: (1) providing a redirect message to the user's mobile device 100, (2) preventing access to the requested site, games portal, videos, etc., and (3) sending updates to the Subscriber Monitoring Device 114 to update the activity history for the user's mobile device 100. In Step 166, the Subscriber Monitoring Device 114 tracks the activity statistics of each user's mobile device 100 based on updates from the Deep Inspection Application Control Server 112. In Step 168, the Subscriber Monitoring Device 114 will send updates on the activity statistics to the Web Account Access Portal 106 so that the subscriber 122 may view the status of users' mobile devices in almost real time.

As described above, exemplary embodiments may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments have been described above with reference to block diagrams and a flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A computer-implemented system comprising:
   a web account access portal communicatively coupled to a programmed computer processor that provides an interface to a subscriber enabling the subscriber to configure a policy profile for association with at least one mobile device of a user, the policy profile comprising one or more parameters associated with monitoring data requested by the user's mobile device, allowing the subscriber to change at least one of the one or more parameters, wherein the interface allows a subscriber to configure a policy profile for a user other than the subscriber;
   a policy profile database that contains at least one policy profile associated with the at least one mobile device;

a deep inspection application control server that includes at least one inspection application that inspects data requested from the user's mobile device for compliance with the policy profile associated with the user's mobile device; and a policy authentication server configured to:
 determine whether the user's mobile device is associated with a policy profile;
 direct data requested by the user's mobile device to the deep inspection application control server in the event the user's mobile device is associated with a policy profile;
 direct data requested by the user's mobile device to the user's mobile device in the event the user's mobile device is not associated with a policy profile; and a partner web portal receiving content from a service provider's own network wherein the partner web portal comprises:
 at least one media server from which a user's mobile device may request services according to the policy profile associated with the user's mobile device, wherein the policy profile is configurable by the subscriber to manage access to a plurality of media services for the user other than the subscriber.

2. The computer-implemented system of claim 1 wherein the web account access portal updates the policy profile database with a policy profile associated with a user's mobile device according to the configuration set by the subscriber.

3. The computer-implemented system of claim 1 further comprising:
 a subscriber monitoring device wherein the deep inspection application control server updates the subscriber monitoring device with information regarding the data requested from the user's mobile device.

4. The computer-implemented system of claim 3 wherein the subscriber monitoring device records information about the data requested by a user's mobile device and further allows a subscriber to view this information through the web account access portal via a interface.

5. The computer-implemented system of claim 1 wherein the policy authentication server is configured to make requests to the policy profile database to have the policy profile database determine if a policy profile is associated with a user's mobile device and wherein the policy authentication server is further operable to take action in response to the replies received from the policy profile database.

6. A computer-implemented process comprising:
 receiving, using a programmed computer processor, a data request from a user's mobile device;
 determining if the user's mobile device has an associated policy profile, the policy profile comprising one or more parameters associated with monitoring data requested by the user's mobile device, at least one of the one or more parameters of the policy profile configured by a subscriber, wherein the subscriber is different from the user;
 in response to determining that the user's mobile device has a policy profile associated with it, sending a copy of the data directed to the user's mobile device to an inspection application for inspection of the data according to the policy profile and only allowing the data complying with the policy profile to be sent the user's mobile device;
 in response to determining that the user's mobile device does not have a policy profile associated with it, allow-ing all data requested by the user's mobile device to be transmitted to the user's mobile device without inspecting the data; and
 providing a partner web portal receiving content from a service provider's own network, wherein the partner web portal comprises at least one media server from which a user's mobile device may request services according to the policy profile associated with the user's mobile device, wherein the policy profile is configurable by the subscriber to manage access to a plurality of media services for the user different from the subscriber.

7. The computer-implemented process of claim 6 further comprising:
 providing a web account access portal to a subscriber via a interface wherein a subscriber can configure a policy profile and associate the policy profile with a user's mobile device.

8. The computer-implemented process of claim 7 wherein the web account access portal includes sending a request to a policy profile database to store the policy profile configured by a subscriber.

9. The computer-implemented process of claim 6 further comprising:
 selecting one or more inspection applications to be associated with the user's mobile device based upon the associated policy profile; and
 examining the data sent to a user's mobile device in accordance with the selected inspection application(s) for compliance with the policy profile associated with the user's mobile device and only allowing the data complying with the policy profile to be sent the user's mobile device.

10. The computer-implemented process of claim 9 wherein examining the data includes sending a message to the user's mobile device if the selected inspection applications determine that the data does not comply with the policy profile associated with the user's mobile device and preventing access to the data if the data does not comply with the policy profile associated with the user's mobile device.

11. The computer-implemented process of claim 6 further comprising:
 monitoring the data requests from the user's mobile device; and
 recording the information about the data requested from the user's mobile device.

12. The computer-implemented process of claim 11 further comprising providing information about the data requested from the user's mobile device to a portal for viewing by a subscriber.

13. A non-transitory computer readable storage medium having computer-readable instructions stored therein, the computer-readable instructions comprising:
 first instructions configured to allow a subscriber to configure a policy profile and associate the policy profile with a user's mobile device, the policy profile comprising one or more parameters associated with monitoring data requested by the user's mobile device, wherein the user configures the policy profile by changing the one or more parameters, and wherein the first instructions allow a subscriber to configure a policy profile for a user other than the subscriber;
 second instructions configured to store the policy profile;
 third instructions configured to receive a request for data from a user's mobile device;
 fourth instructions configured to determine if the user's mobile device has an associated policy profile;

fifth instructions configured, in response to a determination that the user's mobile device has an associated policy profile, to send a copy of the data to an inspection application for inspection of the data according to the policy profile and only allowing the data that complies with the policy profile to be sent to the user's mobile device;

sixth instructions configured, in response to a determination that the user's mobile device does not have a policy profile associated with user's mobile device, to allow all data to pass to the user's mobile device without inspecting the data; and seventh instructions configured to provide a partner web portal that receives content from a service provider's own network, wherein the partner web portal includes at least one media server from which a user's mobile device may request services according to the policy profile associated with the user's mobile device, wherein the policy profile is configurable to manage, by the subscriber, access to a plurality of media services for the user other than the subscriber.

14. The non-transitory computer readable storage medium of claim 13 further comprising seventh instructions configured to send a message to the user's mobile device if the data request does not comply with the policy profile associated with the user's mobile device.

15. The non-transitory computer readable storage medium of claim 13 further comprising:

eighth instructions configured to select one or more inspection applications to be associated with the user's mobile device based upon the associated policy profile; and ninth instructions configured to examine the data sent to a user's mobile device in accordance with the selected inspection application(s) for compliance with the policy profile associated with the user's mobile device and to only allow the data complying with the policy profile to be sent the user's mobile device.

16. An apparatus comprising:

a server configured to receive a data request from a user's mobile device, said server comprising a processor configured to:

determine if the user's mobile device has an associated policy profile, the policy profile comprising one or more parameters associated with monitoring data requested by the user's mobile device, the one or more parameters set by a subscriber, wherein the subscriber is capable of setting one or more parameters for a user other than the subscriber;

send a copy of the data directed to the user's mobile device to an inspection application for inspection of the data according to the policy profile;

only allow the data complying with the policy profile to be sent the user's mobile device in response to determining that the user's mobile device is associated with at least one policy profile;

allow all data requested by the user's mobile device to be transmitted to the user's mobile device without inspecting the data in response to determining that the user's mobile device is not associated with a policy profile; and provide a partner web portal receiving content from a service provider's own network, wherein the partner web portal includes at least one media server from which a user's mobile device may request services according to the policy profile associated with the user's mobile device, wherein the policy profile is configurable to manage, by the subscriber, access to a plurality of media services for the user other than the subscriber.

17. The apparatus of claim 16 wherein the processor is further configured to:

monitor the data requests from the user's mobile device; and record the information about the data requested from the user's mobile device.

18. The apparatus of claim 17 wherein the processor is further configured to provide information about the data requested from the user's mobile device to a portal for viewing by a subscriber.

* * * * *